(12) United States Patent
Ahafonkin

(10) Patent No.: US 10,380,454 B2
(45) Date of Patent: Aug. 13, 2019

(54) IDENTIFYING A VISUAL CENTER OF A POLYGON

(71) Applicant: Mapbox, Inc., San Francisco, CA (US)

(72) Inventor: Volodymyr Ahafonkin, Kiev (UA)

(73) Assignee: Mapbox, Inc., San Francisco, CA (US)

( * ) Notice: Subject to any disclaimer, the term of this patent is extended or adjusted under 35 U.S.C. 154(b) by 137 days.

(21) Appl. No.: 15/644,183

(22) Filed: Jul. 7, 2017

(65) Prior Publication Data
US 2019/0012571 A1    Jan. 10, 2019

(51) Int. Cl.
| | |
|---|---|
| *G06K 9/00* | (2006.01) |
| *G06K 9/62* | (2006.01) |
| *G06K 9/32* | (2006.01) |
| *G01C 21/32* | (2006.01) |
| *G06F 16/29* | (2019.01) |

(52) U.S. Cl.
CPC ......... *G06K 9/6215* (2013.01); *G01C 21/32* (2013.01); *G06F 16/29* (2019.01); *G06K 9/32* (2013.01); *G06K 2009/3225* (2013.01)

(58) Field of Classification Search
None
See application file for complete search history.

(56) References Cited

U.S. PATENT DOCUMENTS

| | | | | |
|---|---|---|---|---|
| 9,245,366 | B1* | 1/2016 | Magouyrk | G06F 16/29 |
| 2006/0265197 | A1* | 11/2006 | Peterson | G06T 9/40 |
| | | | | 703/2 |
| 2013/0181993 | A1* | 7/2013 | Herring | G06T 11/206 |
| | | | | 345/440 |
| 2015/0248192 | A1* | 9/2015 | Katragadda | G06F 16/951 |
| | | | | 715/771 |

OTHER PUBLICATIONS

Garcia-Castellanos, D., et al., "Poles of Inaccessibility: A Calculation Algorithm for the Remotest Places on Earth," Scottish Geographical Journal, Sep. 2007, pp. 227-233, vol. 123, No. 3.
Garcia-Castellanos, D., et al., "poles of inaccessibility," Google Sites, 2007, 5 Pages [online] [retrieved on Sep. 26, 2017] Retrieved from the internet <URL:https://sites.google.com/site/polesofinaccessibility/>.

* cited by examiner

*Primary Examiner* — Hadi Akhavannik
(74) *Attorney, Agent, or Firm* — Fenwick & West LLP

(57) ABSTRACT

Systems and methods for identifying a visual center of a polygon associated with map data for use in a map application are provided. The method involves receives electronic map data describing a shape with a boundary, and generating a first plurality of cells, each cell corresponding to a respective portion of the shape. The method further involves selecting the first plurality of cells as a selected set of cells to process, and recursively processing the selected set of cells to determine a maximum distance cell that corresponds to a portion of a cell of the first plurality of cells. The maximum distance cell has a highest distance to the boundary of the shape, and is located within the boundary of the shape. An electronic map is provided with an image of the shape and additional data that is displayed at the location of the maximum distance cell within the shape.

20 Claims, 6 Drawing Sheets

IDENTIFYING A VISUAL CENTER OF A POLYGON

BACKGROUND

Digitally stored electronic maps are used to provide directions to users of mobile devices, for example, using any of a wide array of standalone map or direction application programs or apps. Today's electronic maps correctly determine where a mobile device is within a few feet or meters, or show where the user of that mobile device is on the electronic map in real time. Electronic maps also typically include other functionality, such as providing turn-by-turn directions to nearly any location. Additional elements such as traffic or wrecks may also be shown.

Electronic maps also appear in other applications aside from standalone mapping applications. For example, ride sharing applications, taxi applications, video games, and other applications may use digital maps. These or other applications can obtain electronic maps by calling a map server computer through an Application Programming Interface (API). Thus, a single electronic map provider that owns or operates the server computer may supply the electronic maps for many different applications.

The electronic map provider may store electronic map data for the many different map applications. However, not all applications require the same set of data. Each application may only use a portion of electronic map data it receives. Sending unnecessary map data is an inefficient use of device memory and network bandwidth, but storing a separate set of map data for each application requires a large amount of storage. Data links between a mobile computing device and server computer may have low bandwidth or high cost, as in the case of some cellular radiotelephone data links. Thus, improved methods for providing electronic map data are needed.

Electronic maps include polygon regions, such as buildings, regions of land, or bodies of water. It is useful to provide labels for these shapes at or near a visual center. A visual center can be a perceived center of a polygon, such as a point at or near the center of a large area of the polygon. Some conventional methods for estimating a visual center of a polygon are error prone, especially for irregularly shaped polygons. For example, calculating a polygon's centroid has been used to estimate its visual center. While calculating a centroid is relatively simple and fast, it does not always find a suitable visual center. For example, for concave polygons, the centroid can fall outside the borders of the polygon, which is not a suitable estimate of a visible center.

Other known methods find an exact visual center of a polygon, which is referred to as a pole of inaccessibility. The pole of inaccessibility is the center of the largest circle that can be inscribed within the polygon (i.e., the largest inscribed circle). The pole of inaccessibility is also the point inside the polygon that is most distant from the border of the polygon. Prior methods for finding the pole of inaccessibility involve performing constrained Delaunay Triangulation or calculating straight skeleton. Both of these methods are slow and computationally expensive. Garcia-Castellanos and Lombardo provided an algorithm for approximating the pole of inaccessibility that involves repeatedly probing a polygon with points on a grid. However, their algorithm is slow on large polygons, and it is not guaranteed to accurately approximate the visual center for irregular polygons.

SUMMARY

An efficient, accurate method for approximating a visual center of a polygon is provided. Efficient determination of a visual center of a polygon is useful to accurately display labels or other data in connection with polygons in maps and other kinds of digital graphical displays. For example, electronic maps typically include labels for buildings, land areas, land masses, bodies of water, etc. These features can be represented as polygons. It is useful to display labels of these features, or other information relating to the features, at or near a visual center of each feature. A viewer would expect the label to be at or near the visual center, so displaying the label or information near the visual center of the regions makes it clear to the viewer which feature the label or information is referring to. For map labelling purposes, an approximation of the visual center is typically sufficient, as long as the approximation is accurate. In addition, finding an approximation, as described herein, requires far less computation than finding the exact pole of inaccessibility. Further, by specifying a high level of precision, the method provided here can provide a visual center that is a very close approximation of the exact pole of inaccessibility.

As discussed herein, an area including a polygon is divided into sections, such as multiple square cells. Calculations are performed on each cell to determine whether it could contain the visual center of the polygon. The visual center of the polygon is the point that is the farthest away from the boundary of the polygon, i.e., the pole of inaccessibility. To determine whether a cell could contain a visual center, it is analyzed to find the maximum possible distance that any point within the cell could be from the boundary of the polygon. Based on this analysis, each cell that could contain the visual center of the polygon (e.g., the cells with a high maximum possible distance) are subdivided into smaller cells, which are similarly analyzed. This process is repeated, examining smaller and smaller cells to find a sufficiently small cell that is farther away from the boundary of the polygon than the other cells. The location of this cell will accurately approximate the visual center of the polygon. Unlike prior solutions, the process described herein is exhaustive, considering all areas on the polygon and only discarding cells that cannot contain the visual center. Thus, the process always finds a good approximation of the visual center of the polygon. In addition, it is significantly faster than prior methods; for example, it is 10-40 times faster than Garcia-Castellanos and Lombardo's approximation method.

More particularly, in some embodiments, the method includes receiving, at a computing device, electronic map data describing a shape having a boundary, the shape being a geometric representation of a real-world object represented by the electronic map data. For example, the electronic map data can include a polygon corresponding to a park, and the boundary represents the edge of the park. The method further includes generating a first plurality of cells, in which each cell corresponds to a respective portion of the shape, and selecting the first plurality of cells as a selected set of cells to process. As one example, an area that includes the polygon is split into four square cells, which are then selected to process. The four cells are stored in a queue. The method further includes recursively processing the selected set of cells to determine a maximum distance cell that corresponds to a portion of a cell of the first plurality of cells. For example, some of the initial cells are split into sub-cells that are added back to the queue; the cells in the queue are continually processed and split until a small cell with a maximum distance to the boundary is found. The maximum distance cell has a highest distance to the boundary of the shape relative to the other cells, and the maximum distance cell is located within the boundary of the shape. An electronic map is provided based on the electronic map data describing the shape. The electronic map includes an image of the shape along with additional data that is displayed at a location of the maximum distance cell within the shape.

In some embodiments, recursively processing the selected set of cells to determine a maximum distance cell includes selecting a cell of the selected set of cells. For example, if the set of cells are stored in a queue, the top cell is selected and removed from the queue. A distance metric for the selected cell may be obtained; the distance metric may be calculated based on a distance from a center of the selected cell to the boundary of the shape. In some embodiments, the distance metric is calculated by adding the radius of the cell to the distance from the center of the cell to the nearest point on the boundary. Some embodiments calculate a signed distance, in which the distance from the center of the cell to the nearest point on the boundary is negative if the center of the cell is outside the polygon and positive if the center of the cell is inside the polygon. The distance metric for the selected cell can be compared to a reference value to determine whether the selected cell should be subdivide into smaller cells, which are then added to the queue for processing.

During the recursive processing, a "best cell" may be found and updated. The "best cell" refers to the best cell that has been analyzed so far, e.g., the cell of the cells that have already been analyzed that is known to be the farthest from the boundary. The reference value may be calculated by adding a precision value to the distance from the center of the best cell to the boundary of the shape.

The recursive processing may further involve comparing a second distance metric of the selected cell to a second reference value describing the best cell. If the second distance metric is higher than the second reference value, the selected cell is stored as the best cell. The second distance metric of the selected cell may be the distance from the center of the selected cell to the nearest point on the boundary to that cell. Similarly, the second reference value may be the distance from the center of the best cell to the nearest point on the boundary, i.e., the second distance metric of the best cell.

The recursive processing may terminate when the size of the best cell is below a threshold size. When the recursive process terminates, the best cell is identified as the maximum distance cell, e.g., the cell having the point with the highest distance to the boundary of the shape.

DETAILED DESCRIPTION

Figure 1:
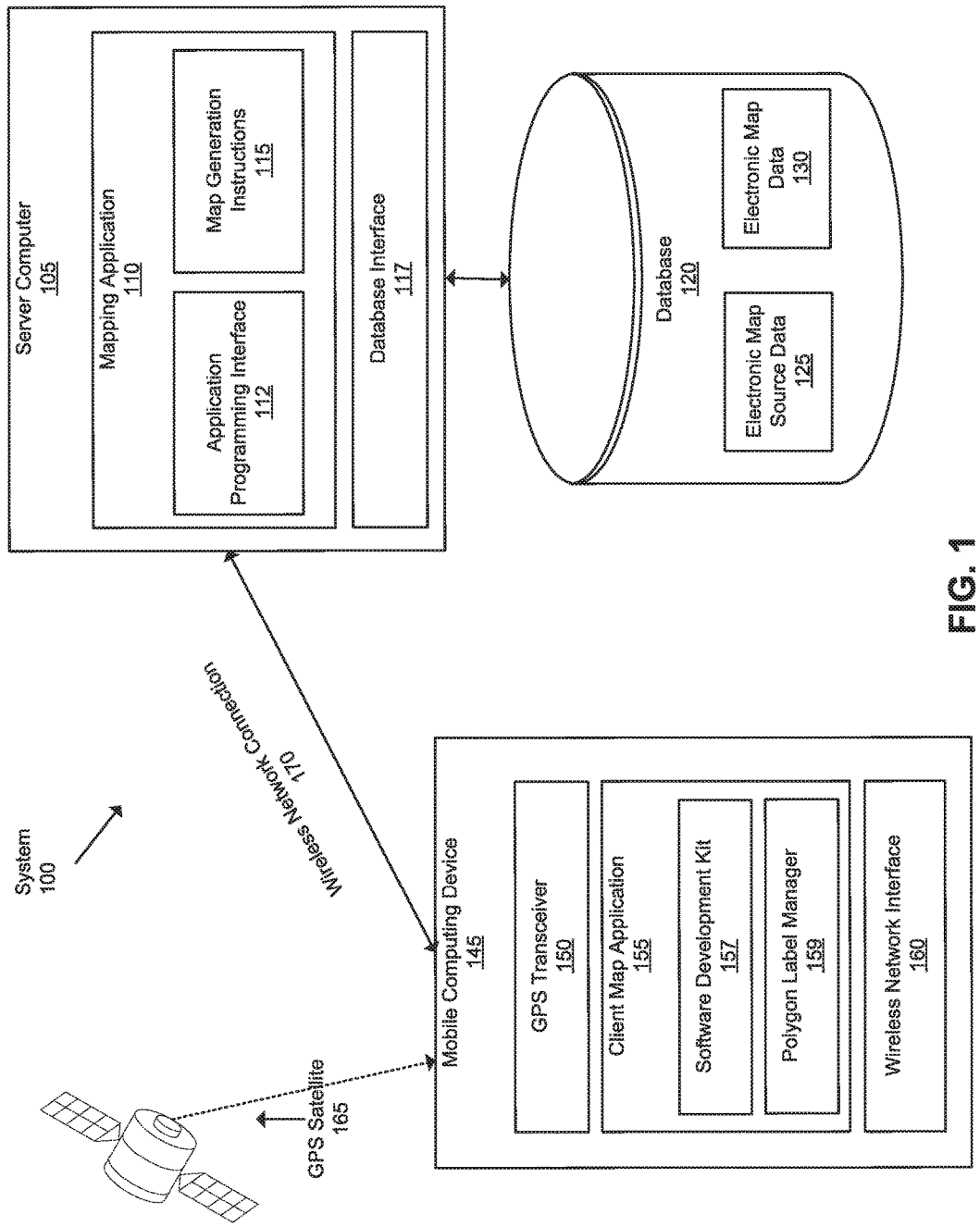
FIG. 1 illustrates an example electronic mapping computer system that supports identifying a visual center of a polygon in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

In an embodiment, improved methods, systems, or apparatus support identifying a visual center of a polygon represented in digital electronic data. In an embodiment, an iterative grid-based algorithm begins with covering a polygon with square cells and then iteratively splitting the square cells in an order of the most promising ones, while aggressively filtering uninteresting cells. A computing device may receive a map tile including digital electronic map data. The computing device may identify a polygon that is associated with the map tile based on the digital electronic map data. In some aspects, after identification the computing device may generate a cell that circumscribes the polygon. The cell may be different dimensions or shapes. For example, the cell may be circular, triangular, square, or rectangular in shape. The cell may also circumscribe a portion of the polygon or the entire polygon. After generating the cell, the computing device divides the cell into multiple sub-cells, and then continues dividing at least some of those sub-cells. The computing device calculates one or more metrics for each cell and use the metric(s) to select cells to further divide. The computing device determines a visual center of the polygon based on one or more metrics of the cells. For example, the one or more metrics may include, but is not limited to, a center of the cell, a radius of the cell, a distance between the center of the cell and spatial data associated with a boundary of the polygon, a distance associated with this distance and the radius, or any combination thereof. In response to determining the center, the computing device may render the map tile via the client map application. The rendered map tile may include the polygon and other data that is displayed at the visual center of the polygon.

Electronic map application programs may provide an interface that displays information relevant to a current global position system (GPS) location. For example, a client computing device may launch an electronic map application program and select to pin-point a current location. In response, the client computing device may determine the GPS location using one or more well-known techniques such as trilateration to identify the device's current location. As a result, the client map application program may render an interface on the client computing device that displays the current location. In addition to displaying the current location, the interface may also display additional data relative to the current location. The additional data may include labels, objects, structures, traffic information, or other items.

In one embodiment, a data processing method includes digitally generating initial square cells that cover a polygon. The cells, and other items specified in this disclosure, are represented using digital data values that are stored in electronic digital memory and manipulated using a central processing unit. The initial cell size may be equal to a width or a fraction of the width, or a height or a fraction of the height of the polygon.

The method may include calculating a distance from the center of each cell to the boundary of the polygon. The method may assign a positive value or a negative value if a point is inside or outside the polygon, respectively. In some cases, the method includes placing the cells into a priority queue and sorting the cells based on a maximum potential distance from a point inside a cell. The point inside the cell may be defined as a sum of the distance from the center and the cell radius. In one aspect, the method calculates the distance from a centroid of the polygon and select it as an initial solution, for example the first "best solution".

Additionally, the method may include retrieving cells from the priority queue consecutively, and calculating the distance from a center of the cell to a boundary of the polygon. If a cell's calculated distance is better than a current best, the method may store and assign the current cell as the best estimate for the center of the polygon. Therefore, the previous current best may be discarded. Further, if the cell potentially contains a better solution than the current best, the method may split the cell into four sub-cells and place them in the priority queue. The method may end when the priority queue has been exhausted and return the best cell's center as the pole of inaccessibility.

FIG. 1 illustrates an example of an electronic mapping computer system that supports identifying a visual center of a polygon in an embodiment.

In the example of FIG. 1, an electronic mapping computer system 100 comprises a plurality of components that may be implemented at least partially by hardware at one or more computing devices, such as one or more hardware processors executing stored program instructions stored in one or more memories for performing the functions that are described herein. In other words, in an embodiment, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

The electronic mapping computer system 100 may include a mobile computing device 145 that is coupled via a wireless network connection 170 to a server computer 105, which is coupled to a database 120. A GPS satellite 165 is coupled via a wireless connection to the mobile computing device 145. The wireless connection between the mobile computing device 145 and the GPS satellite 165 may be like the wireless network connection 170.

In an embodiment, server computer 105 comprises a mapping application 110, an application programming interface (API) 112, map generation instructions 115, and a database interface 117. In an embodiment, database 120 comprises electronic map source data 125 and electronic map data 130. In an embodiment, mobile computing device 145 comprises a GPS transceiver 150, client map application 155, software development kit (SDK) 157, a polygon label manager 159, and a wireless network interface 160. In one embodiment, mobile computing device 145 may be any mobile computing device, such as a laptop, hand-held computer, wearable computer, cellular or mobile phone, portable digital assistant (PDA), portable navigation device, or tablet computer. Additionally or alternatively, mobile computing device 145 may be a navigation system installed in a car or other vehicle. Although a single mobile computing device is depicted in FIG. 1, any number of mobile computing devices may be present. In some examples, mobile computing device 145 may be communicatively connected to server computer 105 through wireless network connection 170 which comprises any combination of a LAN, a WAN, one or more internetworks such as the public Internet, a cellular network, a millimeter wave (mmW) connection related to new radio systems, or a company network.

In an embodiment, mobile computing device 145 may be communicatively coupled to GPS satellite 165 using GPS transceiver 150. GPS transceiver 150 may be a transceiver used by mobile computing device 145 to receive signals from GPS satellite 165, which broadly represents three or more satellites from which the mobile computing device may receive signals for resolution into a latitude-longitude position via triangulation calculations.

Mobile computing device 145 may also include wireless network interface 160, which is used by the mobile computing device 145 to communicate wirelessly with other devices. For example, wireless network interface 160 may be used to establish wireless network connection 170 to server computer 105. Wireless network interface 160 may use Wi-Fi, WiMAX, Bluetooth, ZigBee, cellular standards, or others.

Mobile computing device 145 may additionally or alternatively include other hardware elements, such as one or more input devices, memory, processors, and the like, which are not depicted in FIG. 1. Mobile computing device 145 may also include applications, software, and other executable instructions to facilitate various aspects of embodiments described herein. These applications, software, and other executable instructions may be installed by a user, owner, manufacturer, or other entity related to mobile computing device 145. In one embodiment, mobile computing device 145 may include a client map application 155 which is software that displays, uses, supports, or otherwise provides electronic mapping functionality as part of the application or software.

Client map application 155 may be any type of computer program application that involves some aspect of displaying a geographic map, such as a car service, a taxi service, a video game, a chat client or a food delivery application. In an embodiment, client map application 155 may obtain electronic mapping functions through SDK 157, which may implement functional calls, callbacks, methods, or other programmatic means for contacting the server computer 105 to obtain digital map tiles or other data that can form the basis of visually rendering a map as part of the client map application 155. In general, SDK 157 is a software development kit that allows developers to implement electronic mapping without having to design the components from scratch. For example, SDK 157 may be downloaded from the Internet by developers, and subsequently incorporated into an application which is later used by individual users.

Server computer 105 may be any computing device, including but not limited to: servers, racks, work stations, personal computers, general purpose computers, laptops, Internet appliances, wireless devices, wired devices, multi-processor systems, mini-computers, and the like. Although FIG. 1 shows a single element, the server computer 105 broadly represents one or more multiple server computers, such as a server cluster, and the server computer 105 may be in one or more physical locations. Server computer 105 may also represent one or more virtual computing instances that execute using one or more computers in a datacenter such as a virtual server farm.

Server computer 105 may be communicatively connected to database 120 and mobile computer device 145 through any kind of computer network using any combination of wired and wireless communication, including, but not limited to: a Local Area Network (LAN), a Wide Area Network (WAN), one or more internetworks such as the public Internet, or a company network. Server computer 105 may in some examples host or execute mapping application 110, and may include other applications, software, and other executable instructions, such as database interface 117, to facilitate various aspects of embodiments described herein.

In one embodiment, database interface 117 may be a programmatic interface such as JDBC or ODBC for communicating with database 120. Database interface 117 may communicate with any number of databases and any type of database, in any format. Database interface 117 may be a piece of customer software created by an entity associated with mapping application 110, or may be created by a third party entity in part or in whole.

In one embodiment, database 120 may be a data storage subsystem consisting of programs and data that may be stored on any suitable storage device such as one or more hard disk drives, memories, or any other electronic digital data recording device configured to store data. Although database 120 is depicted as a single device in FIG. 1, database 120 may span multiple devices located in one or more physical locations. For example, database 120 may include one or more nodes located at a data warehouse(s). Additionally, in one embodiment, database 120 may be located on the same device(s) as server computer 105. Alternatively, database 120 may be located on a separate device(s) from server computer 105.

Database 120 may be in any format, such as a relational database, a no SQL database, or any other format. Database 120 may be communicatively connected with server computer 105 through any kind of computer network using any combination of wired and wireless communication of the type previously described. Optionally, database 120 may be communicatively connected with other components, either directly or indirectly, such as one or more third party data suppliers. Generally, database 120 stores data related to electronic maps including, but not limited to: electronic map source data 125 and electronic map data 130.

In some examples, electronic map source data 125 may be raw digital map data that may be obtained, downloaded, or received from a variety of sources. The raw digital map data may include satellite images, digital street data, building or place data, or terrain data. Example sources include National Aeronautics and Space Administration (NASA), United States Geological Survey (USGS), and DigitalGlobe. Raw digital map data may also be defined by a user and uploaded to the server computer. Electronic map source data 125 may be updated at any suitable interval, and may be stored for any amount of time. Once obtained or received, electronic map source data 125 may be used to generate electronic map data 130.

Electronic map data 130 may be digital map data that is provided, either directly or indirectly, to client map applications, such as client map application 155, using an API. Electronic map data 130 may be based on electronic map source data 125. Specifically, electronic map source data 125 may be processed and organized as a plurality of map tiles. Electronic map data 130 may be updated at any suitable interval, and may include additional information beyond that derived from electronic map source data 125. For example, additional information may include metadata, as discussed elsewhere herein.

A map tile may correspond to a square area of a geographic map at a particular zoom level, or an area of a pre-defined size and location within a geographic map. Additionally or alternatively, electronic map data 130 may comprise a plurality of map tile sets. A first set of map tiles may include electronic map data derived from a first set of electronic map source data, while a second set of map tiles may include electronic map data derived from a second set of electronic map source data.

In an embodiment, a map tile may include data describing map geometries, such as points, lines, and polygons, of features on the map. Additionally or alternatively, the map tile contains metadata, such as road names, place names, house numbers, feature types, and other properties. For example, electronic map data in a map tile corresponding to a portion of a geographic map may include geometry data representing roads, buildings, water, parks, or other items, to be depicted within the portion of the geographic map, as well as geometries for suggested placement of labels and other cartographic features. The map tile may also include metadata corresponding to each feature, such as names that can be rendered as labels on a digital map. Additionally or alternatively, the metadata includes data indicating the portion of the geographic map that the map tile corresponds to. For example, the metadata may include data indicating one or more coordinates of the map tile or one or more boundaries of the map tile. In an embodiment, map tiles are used by program libraries and SDKs, such as SDK 157, as part of displaying maps on a mobile computing device or a browser. A map application or a browser may request one or more map tiles and process the map tiles to cause display of a visual map.

In an embodiment, map tiles are rendered when requested by a client such as by a browser of mobile computing device 145. Rendering may be performed by a rendering library of a client map application or on a server computer. Example rendering libraries include, but are not limited to, Mapbox GL JS, available from Mapbox, Inc., San Francisco, Calif., the Mapbox iOS SDK, Mapbox Android SDK, the Mapbox GL native renderer, or through a Mapbox API.

In an embodiment, mapping application 110 provides the API 112 that may be accessed, for example, by client map application 155 using SDK 157 to provide electronic mapping to client map application 155. Specifically, mapping application 110 comprises program instructions that are programmed or configured to perform a variety of backend functions needed for electronic mapping including, but not limited to: receiving map tile requests from mobile computing devices, sending electronic map data to mobile computing devices, receiving electronic map source data 125 from data providers, processing electronic map source data 125 to generate electronic map data 130, and any other aspects of embodiments described herein. Mapping application 110 includes map generation instructions 115 which are programmed or configured to perform map tile generation. In one embodiment, map generation instructions 115 are programmed or configured to receive a request for a map tile, retrieve map data from electronic map data 130, and generate a map tile based on the map data.

In an embodiment, map generation instructions 115 is configured to receive a request for a map tile asynchronously as a client map application is running on a mobile computing device. Map generation instructions 115 may be configured to generate the map tile within a time that is sufficient for the client map application 155 to receive and cause displaying the map tile as part of a continuously generated visual map in a display of the mobile computing device 145. Additionally or alternatively, map generation instructions 115 may receive the request for a map tile asynchronously as server computer 105 is rendering a visual map for display in a browser. Map generation instructions 115 may be configured to generate the map tile within a time that is sufficient for the server computer 105 to receive and cause rendering the map tile as part of a continuously generated visual map.

Polygon label manager 159 may transmit to server computer 105 a request to obtain the map tile asynchronously as the client map application is executing on the mobile computing device 145. Polygon label manager 159 may receive the map tile from server computer 105 based on the transmitted request. The map tile may include digital electronic map data. In response to receiving the map title, polygon label manager 159 may identify at least one polygon that is associated with the map tile based on the digital electronic map data. In some cases, the at least one polygon may be a geometric representation of a real-world object associated with the digital electronic map data. For example, the polygon may represent a building, a neighborhood, a city, a park, an airport, a county, province, a state, a country, any body of water, or any other feature with a boundary.

Polygon label manager 159 may generate a cell that circumscribes the polygon based on one or more parameters of the polygon.

Polygon label manager 159 may determine a visual center of the at least one polygon as described in detail with respect to FIGS. 2-5. The polygon label manager 159 may render a rendered map tile that includes the identified polygon and other data that is displayed at the center of the polygon.

For illustrating a clear example, the foregoing description has specified that the map generation instructions 115 of FIG. 1 perform certain operations, functions, and have certain programming. However, in other embodiments, the same operations, functions, and programming may be implemented in programs or logic that are separate from the map generation instructions 115, such as a utility program or library. For example, the function of caching a map tile in memory may be implemented in a library that the map generation instructions 115 calls. Additionally or alternatively, map generation instructions 115 may communicate or interface with any other applications, software, or modules that are executed by server computer 105, such as operating systems or drivers, as needed to implement the functionality described herein.

Figure 2:
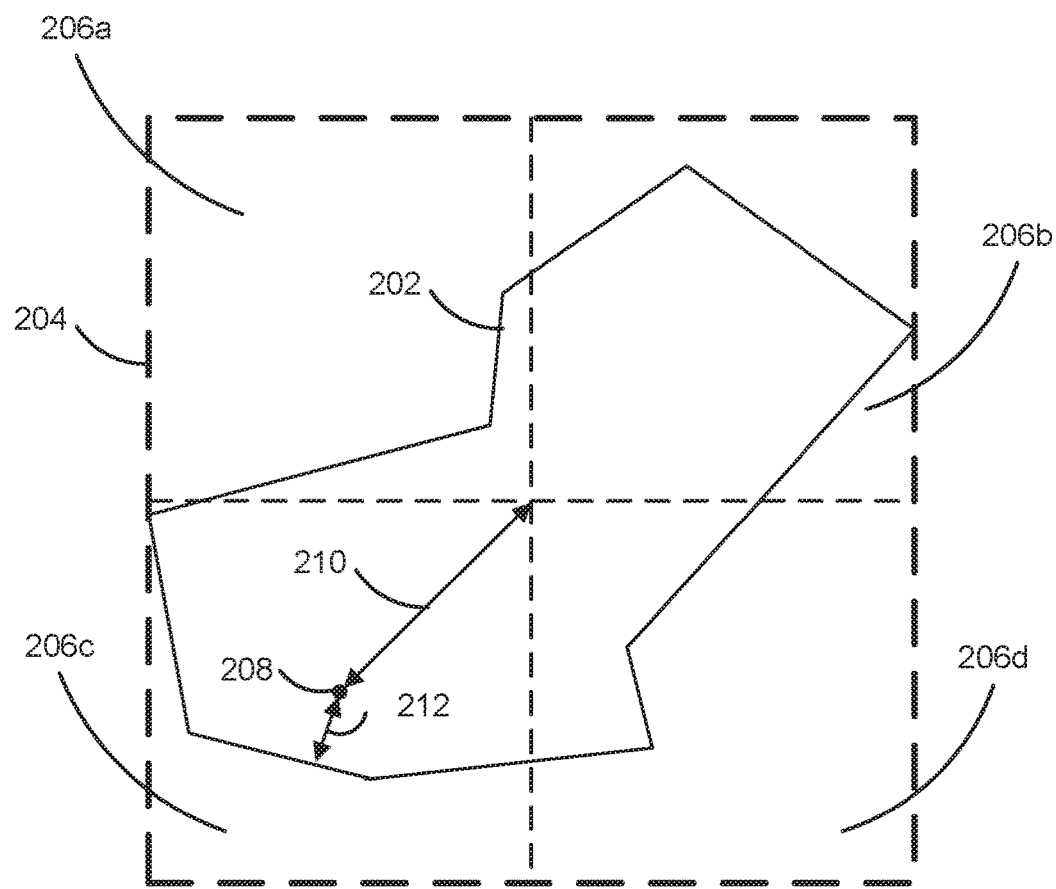
FIG. 2 illustrates a visualization of a polygon being processed to find a visual center in an embodiment.

FIG. 2 illustrates a visualization of a polygon 202 being processed by a computing device, such as computing device 145, to find a visual center in an embodiment. In general, an area covering a polygon, such as polygon 202, is defined, and this area is recursively sub-divided into cells. The computing device analyzes the cells to determine whether they could include the visual center of the polygon, and if they can, the computing device subdivides them; if they cannot, they are discarded. As shown in FIG. 2, search area 204 is drawn around polygon 202. The search area 204 is a square, and the computing device can sub-divide it into square quadrants. In other embodiments, other shapes are used for the search area 204. The computing device may determine a dimension of the search area 204 based on spatial data of the polygon 202. In this case, the computing device may circumscribe a search area 204 around the polygon 202 based on the determined dimension. Alternatively, the computing device may obtain a stored dimension value specifying a dimension of the cell and circumscribe the polygon 202 based on the stored dimension value that was obtained.

As shown in FIG. 2, the search area 204 circumscribes the polygon 202, so that no part of the polygon 202 is outside of the search area 204. However, the search area 204 touches the polygon 202 at its leftmost and rightmost edge. For a square or rectangular search area, the computing device may define the search area 204 based on the width and height of the polygon 202. In particular, the computing device may use the larger of the width and height (in this case, the width) as the side length of the search area 204. As an alternative, the computing device can use the lower of the width and the height as the side length to form the initial search cells within the search area; the search area can then encompass the cells of the initial search cell size needed to cover the polygon. In other embodiments, the search area need not circumscribe the entire polygon if it is known that the area outside of the search area does not include the visual center.

After generating the search area, the computing device divides the search area into two or more cells. As shown in FIG. 2, a computing device has sub-divided the search area 204 into four cells of equal size and shape: cells 206a, 206b, 206c, and 206d. The computing device can determine measurements for each of the cells 206a, 206b, 206c, and 206d, and the computing device uses these measurements to determine which of the cells 206a, 206b, 206c, and 206d to continue searching to find the visual center. In FIG. 2, measurements for cell 206c in the lower left portion of the search area 204 and the polygon 202 are demonstrated. The center 208 of the cell 206c is shown, and extending from the center 208 are two measurements: a radius 210 and a distance to the polygon boundary 212. The radius 210 is defined as the distance of the center 208 of the cell 206c to the corner of the cell 206c. The computing device may calculate the radius 210 by multiplying the size of the cell 206c (i.e., the length of one side of the cell 206c) by $\sqrt{2}/2$. The distance to the polygon boundary 212 is defined as the distance from the center 208 to the point on the border of the polygon 202 that is nearest to the polygon boundary. The computing device may determine the distance to the polygon boundary 212 by calculating the distances from the center 208 to each segment of the polygon 202 and taking the minimum of these distances.

The computing device can use the measurements 210 and 212 to calculate the maximum potential distance from any point within the cell 206c to the boundary of the polygon 202. The computing device can use the maximum potential distance to discard cells during the process of finding the visual center. In particular, comparing two cells, if the distance from the center of a first cell to the polygon boundary is greater than the maximum potential distance calculated for a second cell, the computing device can discard the second cell. This is because it is known that a point within the first cell has a greater distance to the polygon boundary than any possible point within the second cell could have to the polygon boundary. Once it is known that the second cell cannot contain the visual center, the second cell can be discarded or ignored. In some embodiments, the maximum potential distance for the cell 206c is calculated as the sum of the radius 210 and the distance to the polygon boundary 212. This maximum potential distance represents a maximum distance between a hypothetical point within the cell 206c and the polygon boundary 212. The maximum potential distance may represent an upper bound for the cell—it can be determined without calculating the actual distance between the polygon 202 and the points within the cell 206c (other than the center 208). No point within the cell 206c must actually be the maximum potential distance away from the polygon 202.

The distance to the polygon boundary 212 can be signed, so that if the center 208 is inside the polygon 202, the distance to the polygon boundary 212 will be positive, and if the center 208 is outside the polygon 202, the distance to the polygon boundary 212 is negative. Using a signed distance helps remove cells that have a high distance to the polygon boundary, but are outside of the polygon 202, and thus cannot contain the visual center of the polygon 202. In the example shown in FIG. 2, the distance to the polygon boundary 212 of cell 206c is positive, because the center 208 is inside the polygon 202.

Figure 3:
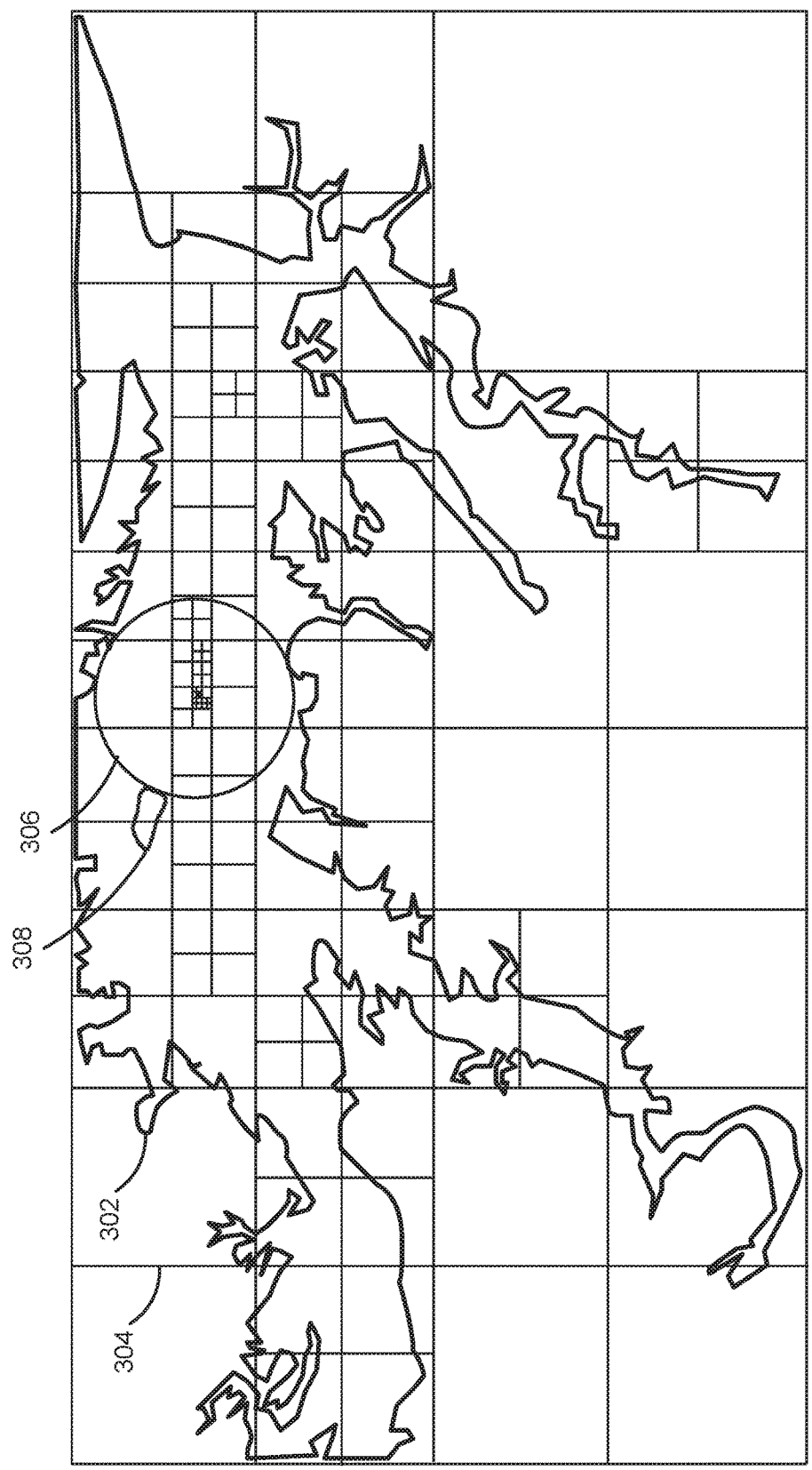
FIG. 3 illustrates a visualization of a polygon that has been processed to find a visual center in an embodiment.

FIG. 3 illustrates a visualization of a polygon that has been processed by a computing device, such as mobile computing device 145, to find a visual center in an embodiment. FIG. 3 shows a polygon 302 and a grid 304 that has been drawn over the polygon 302. The bounds of the grid 304 are rectangular, but the grid 304 has been divided into squares. In this example, the first line drawn of the grid 304 divided the search area into two square cells. The grid 304 has been recursively divided in the more promising areas (which may also be referred to as subcells) that are potentially farther from the border of the polygon 302 and thus closer to the visual center of the polygon 302. The largest inscribed circle 306 shows the location of the visual center of the polygon 302; in particular, the visual center of the polygon 302 is at the center of the largest inscribed circle 306. The largest inscribed circle 306 is bounded at its left by an internal boundary 308. For example, if the polygon 302 corresponds to a land mass, the internal boundary 308 may be a body of water, such as a lake. The internal boundary 308 may be treated as part of the boundary of the polygon 302, as it has in FIG. 3, or internal boundaries such as the internal boundary 308 may be ignored for the purpose of finding the visual center of the polygon 302. The grid 304 demonstrates the process of finding a visual center. The portion of the grid 304 that covers the polygon 302 has been divided into more cells and smaller cells than the portions of the grid 304 that cover empty regions not occupied by the polygon 302. For example, the lower right hand corner of the grid 304 has not been explored, since it is not close to the visual center of the polygon 302. The maximum potential distance of this cell would be very low. On the other hand, the portion of the grid within the largest inscribed circle 306 has been repeatedly segmented and explored, with the cells getting smaller around the visual center.

Figure 4:
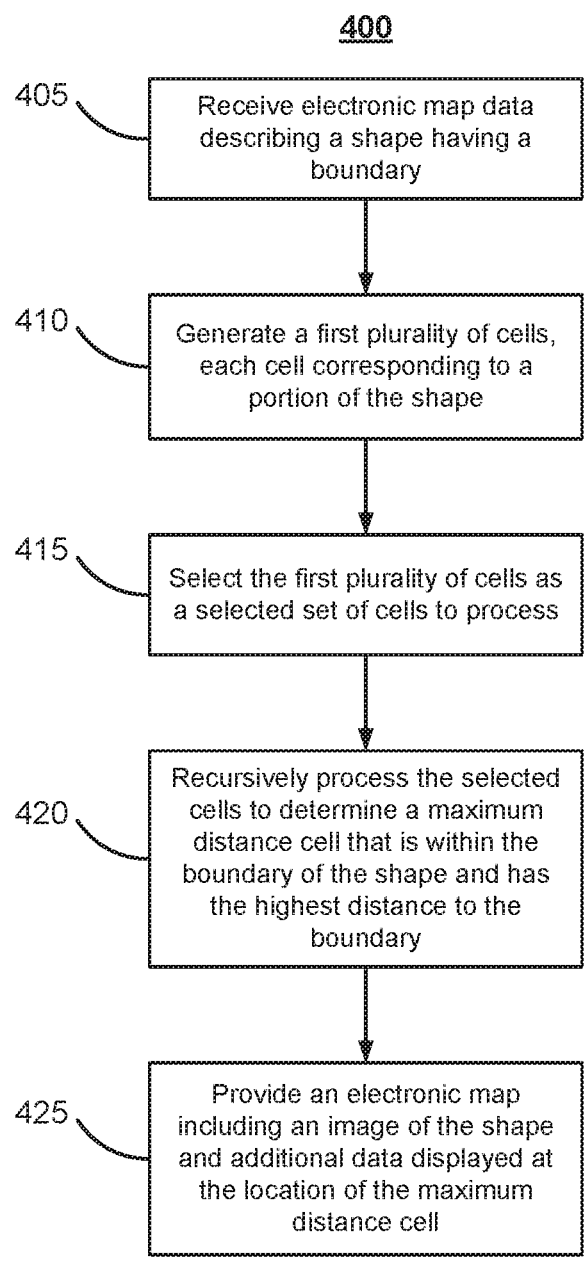
FIG. 4 illustrates a process for providing a map with data at a visual center of a polygon in an embodiment.

FIG. 4 illustrates a process 400 for providing a map with data at a visual center of a polygon in an embodiment. In various embodiments, the operations of method 400 of FIG. 4 may be implemented in programming by a mobile computing device 145 or its components as described herein. For example, the operations of method 300 may be performed by a polygon label manager 159 as described with reference to FIG. 1. In some examples, mobile computing device 145 may execute a set of instructions or sequence of instructions to control the functional elements of mobile computing device 145 to perform the functions described below.

Additionally or alternatively, the mobile computing device 145 may perform aspects of the functions described below using special-purpose hardware.

At 405, the mobile computing device 145 receives electronic map data describing a shape having a boundary. The shape may be a geometric representation of a real-world object represented by the electronic map data. In some embodiments, the electronic map data is a map tile. The shape may be a polygon or a three-dimensional shape, such as a polyhedron or polygon mesh.

At 410, the mobile computing device 145 generates a first plurality of cells, each cell corresponding to a portion of the shape. As shown in FIGS. 2 and 3, the cells may be squares. The cells may cover the entire shape. In order to ensure that the shape is covered, the computing device may generate a search area that circumscribes the shape and segment the search area into the first plurality of cells. For example, as shown in FIG. 2, the computing device generated a search area 204 and four cells 206a, 206b, 206c, and 206d, each of which covered a portion of the shape. In some embodiments, the computing device generates additional cells, some of which do not correspond to a portion of the shape, e.g., if one quadrant of a search area does not include any portion of the shape.

At 415, the mobile computing device 145 selects the first plurality of cells as a selected set of cells to process. The selected cells are stored in a data structure to which various sub-cells of the first plurality of cells will be selected and added, and from which cells will be removed. For example, the mobile computing device 145 can select and store the first plurality of cells in a queue. In some embodiments, the queue is a priority queue that orders the cells according to a priority. The priority may be based on how likely each cell is to contain the visual center, which may be assessed based on the maximum potential distance of the cells, as described above with respect to FIG. 2.

In some embodiments, the mobile computing device 145 selects a subset of the first plurality of cells to process. In one example, before selecting the cells to process, the mobile computing device 145 compares one or more metrics of the cells (e.g., the distance from a cell's center to the boundary and/or the maximum potential distance, described above with respect to FIG. 2) and immediately discards one or more cells. For example, if the computing device generated four cells, and one of the cells does not include any portion of the shape, the computing device may only select the cells that do include a portion of the shape to process.

At 420, the mobile computing device 145 recursively processes the selected cells to determine a maximum distance cell that is within the boundary of the shape and has the highest distance to the boundary of the shape. The maximum distance cell corresponds to a portion of a cell of the first plurality of cells. Often, though not always, it is a smaller cell that is formed by repeated segmenting of another, larger cell of the first plurality of cells. The maximum distance cell is the cell that includes the visual center, and the maximum distance cell is typically below a threshold size so that the estimation of the visual center (e.g., the center of the maximum distance cell) is within a desired level of precision.

A recursive process is any process that recurs or repeats some aspect of the process. The recursive process 420 typically involves repeatedly analyzing cells, segmenting certain cells, and discarding other cells. The recursive process 420 may operate on a set of cells that generally includes cells of decreasing size as the process 420 proceeds. The recursive process 420 may be implemented using one or more recursive functions, iterative functions, and/or loops. FIG. 3 visually illustrates an exemplary process of recursively processing cells to determine a maximum distance cell. An exemplary recursive process for determining a maximum distance cell is described in detail with respect to FIG. 5.

At 425, the mobile computing device 145 provides an electronic map including an image of the shape and additional data displayed at the location of the maximum distance cell. The electronic map is based on the electronic map data describing the shape. For example, the mobile computing device 145 may render a map tile including at least one polygon and other data that is displayed at the center of the at least one polygon. The map rendering may be performed by client map application 155.

Figure 5:
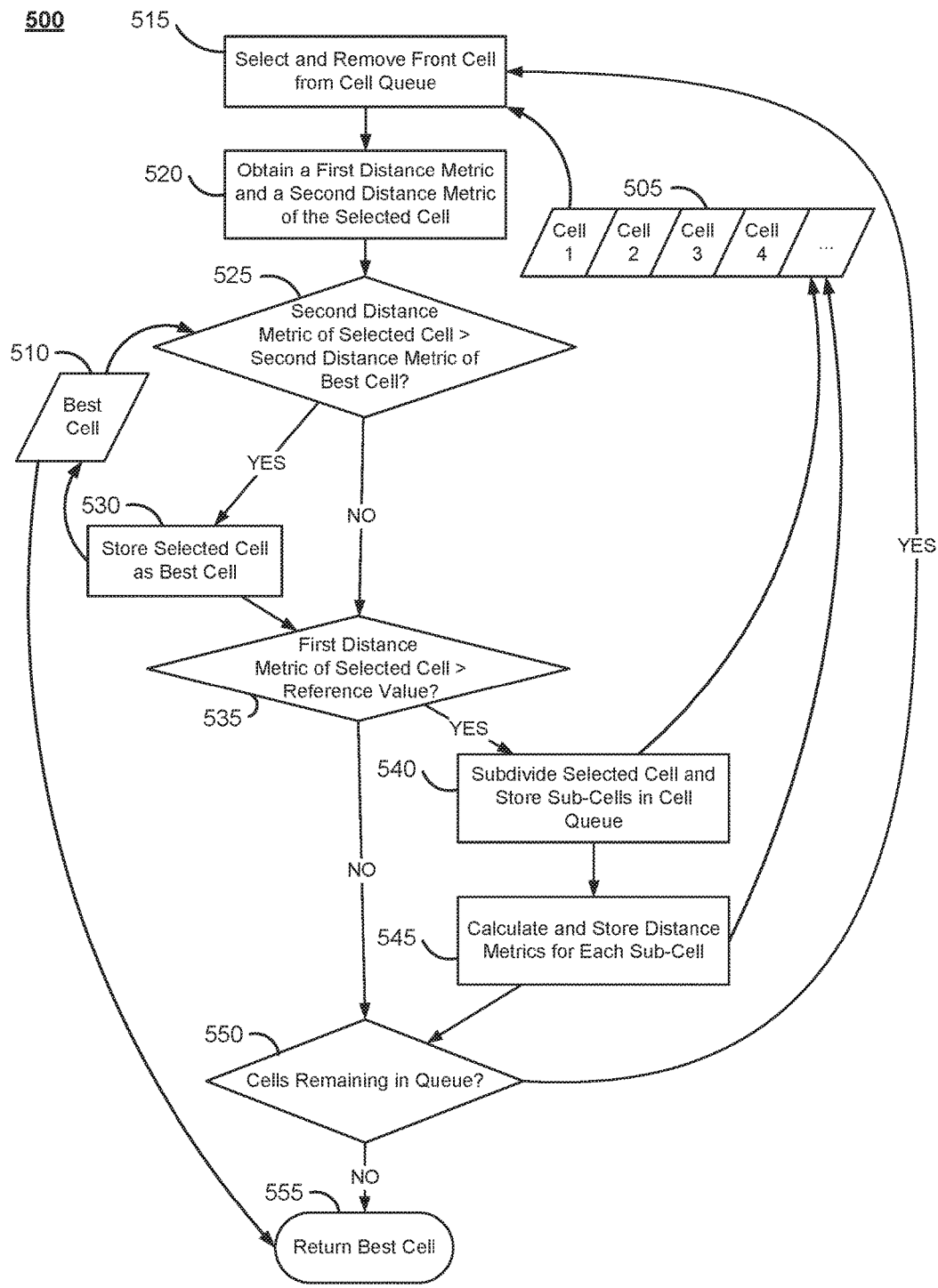
FIG. 5 illustrates a process for identifying a visual center of a shape in embodiments.

FIG. 5 illustrates a process 500 for identifying a visual center of a shape in embodiments. Process 500 demonstrates one embodiment for recursively processing the selected cells at 420 in FIG. 4. Process 500 starts with an initial set of cells and returns a "best cell," also referred to as a maximum distance cell, which is an estimate of the visual center of the shape.

FIG. 5 shows the interactions of the process 500 with a cell queue 505 and a "best cell" 510. The cell queue 505 includes all cells remaining to be processed by process 500. At the start of the process 500, the cell queue 505 includes the first plurality of cells generated at 410 and selected at 415, as described above with respect to FIG. 4. As cells are segmented during the process 500, they are added to the cell queue 505.

The cell queue 505 can be a standard queue, in which the first cells added to the queue are the first cells that are removed from the queue. Alternatively, the cell queue 505 may be a priority queue. The priority may be based on how likely each cell is to contain the visual center, which may be assessed based on the maximum potential distance of the cells. The maximum potential distance for a cell, as described above with respect to FIG. 2, is the greatest possible distance between the shape boundary and any point within the cell. By using a priority queue, the most promising cells will be analyzed first. As discussed further below, using a priority cell can increase the speed of the process 500 by minimizing the amount of cells that need to be segmented and analyzed. The cell queue 505 may be organized based on other metrics or principles; in some examples, the cell queue 505 is organized based on the locations of the cells, the distances from a particular point within the cells to the shape boundary, or the sizes of the cells. Other data structures for storing a set of cells, such as a stack, may be used instead of the cell queue 505.

Each cell within the cell queue 505 may be defined by a data structure having several fields for identifying the cell. The cell data structure fields may include fields for data describing the location of the cell within the search area (e.g., one or more points defining a corner or one or more corners, or lines defining the edges of the cell); data describing the size of the cell (e.g., a height and/or width, a radius, and/or the boundaries of the cell); data describing one or more distance metrics of the cell (e.g., the distance from the center of the cell to the boundary of the shape, this distance plus the cell radius); and/or any other desired data.

The best cell 510 refers to the cell, of the cells that have already been processed, that has the highest distance from a particular point within the cell (e.g., its center) to the boundary of the shape at some point during the process 500. The best cell 510 can change as process 500 runs; for example, at the start of the process 500, the best cell 510 may be one of the first plurality of cells, but as the process 500 continues, the best cell 510 changes and become more precise. In some embodiments, an initial guess for the best cell is stored in best cell 510. For example, the initial guess can be based on the polygon centroid. In particular, the computing device 145 may calculate the centroid of the shape, determine which cell of the first plurality of cells includes the centroid, and select this cell as the initial best cell. In other embodiments, the best cell 510 is empty at the start of process 500, and the first cell to be processed is set as the best cell 510.

At 515, the computing device 145 selects and removes the front cell from the cell queue 505. The front cell can be removed from the cell queue 505, because if it has a chance of containing the visual center, it will be subdivided into smaller cells which are added back to the cell queue. Otherwise, it will not be added back to the cell queue 505, and is removed or discarded from further processing.

At 520, the computing device 145 obtains a first distance metric and a second distance metric of the selected cell. In some embodiments, the computing device 145 calculated the first and second distance metrics before selecting and removing the cell at 515. In this case, the computing device 145 obtains the first and second distance metrics by retrieving the stored first and second distance metrics. For example, the distance metrics may be included in the data stored for the cell in the cell queue 505. If the computing device 145 has not already calculated the first and second distance metrics, the computing device obtains the first and second distance metrics by calculating the first distance metric and the second distance metric. In some embodiments, the first distance metric is the sum of the radius of the selected cell and the distance from the center of the selected cell to the nearest point on the boundary of the shape. As discussed above with respect to FIG. 2, the computing device 145 may determine the distance to the boundary by calculating the distances from the center of the selected cell to each segment of the shape and taking the minimum of these distances. The first distance metric may be potential cell maximum of the selected cell.

In some embodiments, the second distance metric is the distance from the center of the selected cell to the nearest point on the boundary of the shape. In such embodiments, the first distance metric is the sum of the second distance metric and the radius of the selected cell. The computing device 145 may first calculate the second distance metric, and then add the radius to the second distance metric to calculate the first distance metric. In other embodiments, either the first distance metric or the second distance metric are obtained, but not both. In other embodiments, the computing device 145 obtains one or more additional or alternative metrics describing a distance or potential distance between the cell and the boundary. For example, one or more distance metrics may be calculated from an edge or a corner of the cell, rather than from the center of the cell.

At 525, the computing device 145 compares the second distance metric of the selected cell to a second distance metric of the best cell 510. If the second distance metric of the selected cell is greater than the second distance metric of the best cell 510, this indicates that the selected cell is a better cell than the current best cell 510, so at 530, the computing device 530 stores the selected cell as the best cell 510. As described with respect to 525, the second distance metric of the selected cell may be the distance from the center of the selected cell to the nearest point on the boundary of the shape. Similarly, the second distance metric of the best cell 510 may be the distance from the center of the best cell 510 to the nearest point on the boundary of the shape. The second distance metric describes a known distance from a point within each cell to the boundary. Thus, the best cell 510 represents the point (i.e., the center of the best cell 510) that has the highest discovered distance to the boundary. In other embodiments, the potential cell maximum of the selected cell (in some embodiments, the first distance metric of the selected cell) and/or the potential cell maximum of the best cell (in some embodiments, the first distance metric of the best cell) are used at 525. In other embodiments, the computing device 145 compares one or more additional or alternative distance metrics of the selected cell and the best cell.

At 535, the computing device 145 compares the first distance metric of the selected cell to a reference value to determine whether to continue processing the selected cell by "drilling down" on the selected cell, i.e., further analyzing sub-cells of the selected cell. The computing device 145 only drills down on cells that (1) have the potential to have a higher distance to the boundary than the best cell; and (2) are not smaller than a required precision. These two conditions may be captured in a single reference value that is equal to the sum of a precision value and a known distance between an examined point and the boundary. The known distance may be the distance from the center of the best cell 510 to the nearest point on the boundary of the shape to the center of the best cell 510, e.g., the second distance metric of the best cell 510. The second distance metric of the best cell 510 may be the highest distance from any point to the boundary of the polygon found so far during the process 500. If the potential cell maximum (i.e., the first metric) of the selected cell is less than the distance from the center of the best cell 510 to the boundary (i.e., the second metric of the best cell 510), it is known that no point within the selected cell can be the visual center, and no cell within the selected cell can be the maximum distance cell. However, if the potential cell maximum of the selected cell is only slightly larger than the distance from the center of the best cell 510 to the boundary, it may not be worthwhile to continue subdividing the selected cell. As the potential cell maximum of various selected cells becomes very close to the distance from the center of the best cell 510, the locations of the selected cells may be closing in around the location of the best cell, and the location of the best cell can be considered a good enough estimate of the visual center. Alternatively, if multiple points within a shape at different locations have the same or very similar distances to the boundary of the cell, a selected cell may not be close to the location of the best cell 510; however, any of these points (or any sufficiently small cell containing one of these points) are adequate estimates of the visual center.

In other embodiments, the computing device 145 determines to drill down on the selected cell by performing two separate decisions at decision 145. For example, the computing device 145 may first compare the size of the selected cell (e.g., the radius of the selected cell or a side length of the selected cell) to a precision value that indicates a size below which cells will not be subdivided. If the size of the selected cell is not greater than the precision value, the selected cell is not segmented and further analyzed. If the size of the selected cell is greater than the precision value, the computing device 145 then compares the potential cell maximum of the selected cell to a distance metric of the best cell 510 that describes a known distance within the best cell to the polygon. For example, the computing device 145 may compare the potential cell maximum of the selected cell to a second distance metric of the best cell 510 that is the distance from the center of the best cell 510 to the nearest point on the boundary of the shape. If the potential cell maximum of the selected cell is greater than the distance metric of the best cell 510, the computing device 145 decides to drill down on the selected cell. The decision whether the size of the selected cell is greater than the precision value and the decision whether the potential cell maximum of the selected cell is larger than the distance metric of the best cell may be performed in the opposite order.

At 540, after determining that the selected cell should be drilled down on by determining, for example, that the first distance metric of the selected cell is greater than a reference value, the computing device 145 subdivides the selected cell and stores sub-cells in the cell queue 505. In some embodiments, the computing device 145 divides the selected cell into four square cells that are quadrants of the selected cell.

At 545, the computing device 145 calculates and stores distance metrics for each sub-cell. The distance metrics may include the first distance metric and the second distance metric described with respect to step 520. In some embodiments, the queue 505 is a priority queue. In such embodiments, the computing device 145 uses a distance metric calculated at 545, such as the first distance metric describing the potential cell maximum, to sort the priority queue 545. By pulling cells from the queue 505 according to their potential cell maximum, the computing device 145 considers the most promising cells first, which allows for more efficient exploration of the cells by more quickly rejecting cells that cannot include the visual center. In other embodiments, the cell queue 505 is not a priority queue, and cells are added and removed according to the order they are created, or according to some other order. In some embodiments, the computing device 145 calculates the distance metrics at a different point of process 500, for example, at 520.

At 550, the computing device 145 determines if there are any cells remaining in the queue. If there are cells remaining, the computing device 145 returns to the beginning of the process 500 and selects and removes the front cell from the cell queue 505 at 515. The computing device 145 continues processing the cells in the cell queue 505 until the cell queue 505 is empty, or until another condition is met. This type of process is referred to herein as a recursive process, because it repeats through the same steps and operates on sub-cells of the initial set of cells. The recursive process can be implemented using recursion or iteration.

If the computing device 145 determines at 550 that there are no cells remaining in the queue 505, the process 500 terminates and returns the best cell 510. The best cell 510 is the cell that estimates the visual center, or pole of inaccessibility, of the shape. A point within the best cell, such as the center of the best cell 510, may be used as the estimate of the visual center.

In alternate embodiments, the computing device 145 determines to terminate the process 500 based on determining that the size of the best cell 510 is below a threshold size. If the best cell 510 is below a threshold size, this indicates that a desired precision has been reached. Before terminating, the computing device 145 may also determine whether the remaining cells in the queue 505 that are the same size as the best cell 510 have been analyzed to ensure that none of the remaining cells in the queue 505 are better than the best cell 510. If cells of the same size as the best cell 510 remain in the queue 505, the computing device 145 first analyzes the remaining cells in the queue 505 before terminating the process 500. After terminating the process 500, the computing device 145 returns the best cell 510. The determination that the desired precision has been reached can alternatively be performed through the determination at 535 by only deciding to subdivide cells that have not reached a precision value; this is described with respect to step 535 above.

In some embodiments, the process 400 and/or process 500 can be used to find a visual center of a three-dimensional shape, such as a polyhedron or a polygon mesh. In such embodiments, the computing device 145 divides the three-dimensional shape into a plurality of three-dimensional cells, and recursively processes the three-dimensional cells to estimate the visual center of the three-dimensional shape. The radius of a three-dimensional cell is the distance from the center of the three-dimensional cell to the corner of the three-dimensional cell. The distance from the center of the three-dimensional cell to the boundary can be calculated by finding the distances from the center of the cell to the nearest point of each plane of the three-dimensional shape, and then finding the minimum of these distances. The computing device 145 may perform a three-dimensional search as described with respect to FIG. 5 based on these calculations.

It should be understood that process 500 describes one exemplary implementation of a recursive process for determining a maximum distance cell that is within the boundary of the shape and has the highest distance to the boundary of the shape. The computing device 145 can implement the process, demonstrated visually in FIG. 3, using different steps from the steps described with respect to FIG. 5, performing the steps of FIG. 5 in a different order, and/or performing different types of calculations than those described with respect to FIG. 5. In general, the process 420 for recursively processing cells to determine a maximum distance cell includes any process that involves subdividing at least some cells into sub-cells, determining which of the sub-cells could potentially include the visual center (or a maximum distance cell), and repeating this process by further dividing the cells that could potentially include the visual center (or a maximum distance cell), determining whether any of the new cells can include the visual center (or maximum distance cell), and so on, until a desired precision is reached. While the priority queue described with respect to FIG. 5 generally provides an efficient order for processing the cells, the computing device 145 can process the cells in any order. In some embodiments, the computing device 145 may not process all cells in the queue 505, or it may remove cells from the queue 505.

Figure 6:
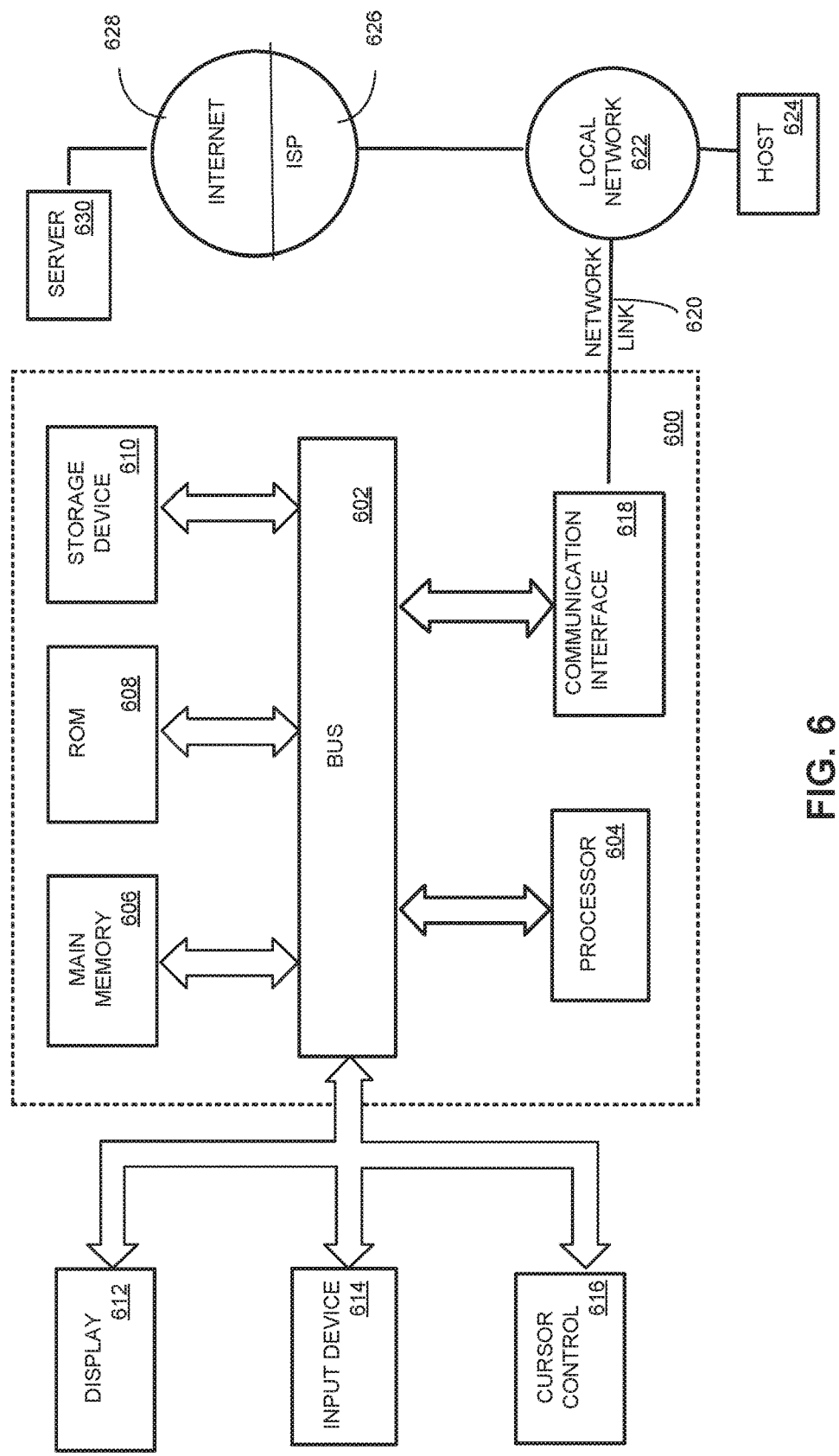
FIG. 6 illustrates an example computer system that supports identifying a visual center of a polygon in an embodiment.

FIG. 6 illustrates an example computer system that supports identifying a visual center of a polygon in accordance with aspects of the present disclosure. According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read-only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as an LCD screen, LED screen, plasma screen, or touch screen, for displaying information to a computer user. An input device 614, which may include a touch screen, alphanumeric keys, or other types of buttons or keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device 616 typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world-wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for digitally displaying a map, the method comprising:
   receiving, at a computing device, electronic map data describing a shape having a boundary, the shape being a geometric representation of a real-world object represented by the electronic map data;
   generating a first plurality of cells, each cell of the first plurality of cells corresponding to a respective portion of the shape such that the shape is divided among the first plurality of cells;
   calculating, for each cell of the first plurality of cells, a distance metric for the cell based on a distance from a center of the cell to a nearest point upon the boundary of the shape;
   selecting at least one cell of the first plurality of cells as a selected set of cells to process;
   recursively processing, based on the calculated distance metrics, the selected set of cells to determine a maximum distance cell that corresponds to a portion of a cell of the first plurality of cells, the maximum distance cell having a highest distance metric, and the center of the maximum distance cell being located within the boundary of the shape; and
   providing an electronic map based on the electronic map data describing the shape, the electronic map comprising an image of the shape and additional data that is displayed at a location of the maximum distance cell within the shape.

2. The method of claim 1, wherein recursively processing the selected set of cells to determine a maximum distance cell comprises:
   selecting a cell of the selected set of cells;
   in response to determining that the distance metric of the selected cell is greater than a reference value, subdividing the selected cell to generate a second plurality of cells, each cell of the second plurality of cells corresponding to a portion of the selected cell;
   calculating, for each cell of the second plurality of cells, a distance metric of each cell; and
   adding the second plurality of cells to the selected set of cells to process.

3. The method of claim 2, wherein calculating the distance metric of a cell comprises:
   selecting a point on the boundary of the shape that is nearest to a center of the cell;
   calculating a distance from the center of the cell to the selected point on the boundary; and
   adding the distance to a radius of the cell to calculate the distance metric for the cell;
   wherein the distance metric is a potential cell maximum that represents the largest possible distance between any point within the cell and the boundary of the shape.

4. The method of claim 2, further comprising:
   in response to determining that a second distance metric of the selected cell is greater than a second reference value, storing the selected cell as a best cell, wherein:
   the second distance metric of the selected cell is a distance from the center of the selected cell to a point on the boundary of the shape that is nearest to a center of the selected cell; and
   the second reference value is the sum of a second distance metric of the best cell and a precision value.

5. The method of claim 4, further comprising calculating the reference value by:
   selecting a point on the boundary of the best cell that is nearest to a center of the best cell;

calculating a distance from the center of the best cell to the selected point on the boundary; and adding the calculated distance to a precision value.

6. The method of claim 4, further comprising:

in response to determining that a size of the best cell is below a threshold size:

determining that the best cell is the maximum distance cell; and terminating the recursive processing.

7. The method of claim 1, further comprising:

storing the selected set of cells in a priority queue, the priority queue sorted according to the distance metric calculated for each cell of the selected set of cells;

wherein recursively processing the selected set of cells comprises recursively processing the selected set of cells in the priority queue, such that a first cell in the selected set of cells having a first distance metric is processed before a second cell in the selected set of cells having second distance metric that is a lower than the first distance metric.

8. A method for digitally displaying a map, the method comprising:

receiving, at a computing device, electronic map data describing a shape having a boundary, the shape being a geometric representation of a real-world object represented by the electronic map data;

generating a first plurality of cells, each cell of the first plurality of cells corresponding to a respective portion of the shape such that the shape is divided among the first plurality of cells;

selecting the first plurality of cells as a selected set of cells to process;

recursively processing the selected set of cells to determine a maximum distance cell that corresponds to a portion of a cell of the first plurality of cells, the maximum distance cell having a highest distance to the boundary of the shape, and the center of the maximum distance cell being located within the boundary of the shape; and providing an electronic map based on the electronic map data describing the shape, the electronic map comprising an image of the shape and additional data that is displayed at a location of the maximum distance cell within the shape.

9. The method of claim 8, wherein recursively processing the selected set of cells to determine a maximum distance cell comprises:

selecting a cell of the selected set of cells;

obtaining a distance metric of the selected cell, the distance metric calculated based on a distance from a center of the selected cell to the boundary of the shape; and in response to determining that the distance metric of the selected cell is greater than a reference value, subdividing the selected cell to generate a second plurality of cells, each cell of the second plurality of cells corresponding to a portion of the selected cell; and adding the second plurality of cells to the selected set of cells to process.

10. The method of claim 9, further comprising calculating the distance metric of the selected cell by:

selecting a point on the boundary of the shape that is nearest to a center of the selected cell;

calculating a distance from the center of the selected cell to the selected point on the boundary; and adding the distance to a radius of the selected cell to calculate the distance metric for the selected cell;

wherein the distance metric is a potential cell maximum that represents the largest possible distance between any point within the selected cell and the boundary of the shape.

11. The method of claim 10, wherein calculating a distance from the center of the selected cell to the selected point on the boundary comprises calculating a signed distance, wherein:

in response to determining that the center of the selected cell is outside of the boundary of the shape, setting the distance from the center of the selected cell to the selected point on the boundary as a negative distance; and in response to determining that the center of the selected cell is inside of the boundary of the shape, setting the distance from the center of the selected cell to the selected point on the boundary as a positive distance.

12. The method of claim 9, further comprising:

in response to determining that a second distance metric of the selected cell is greater than a second reference value, storing the selected cell as a best cell, wherein the second reference value is a second distance metric of the best cell.

13. The method of claim 12, further comprising calculating the reference value by:

selecting a point on the boundary of the best cell that is nearest to a center of the best cell;

calculating a distance from the center of the best cell to the selected point on the boundary; and adding the calculated distance to a precision value.

14. The method of claim 12, wherein the second distance metric is the distance from a center of a particular cell to a point on the boundary of the shape that is nearest to the center of the particular cell.

15. The method of claim 12, further comprising:

in response to determining that a size of the best cell is below a threshold size:

determining that the best cell is the maximum distance cell; and terminating the recursive processing.

16. The method of claim 12, further comprising:

calculating a centroid of the shape;

identifying a cell in the first plurality of cells that includes the centroid; and prior to recursively processing the selected set of cells, setting the best cell to be the identified cell.

17. The method of claim 8, wherein each cell of the first plurality of cells is square, and subdividing the selected cell to generate a second plurality of cells comprises subdividing the selected cell into four square cells.

18. The method of claim 8, further comprising:

storing the selected set of cells in a priority queue, the priority queue sorted according to a distance metric calculated for each cell of the selected set of cells;

wherein recursively processing the selected set of cells comprises recursively processing the selected set of cells in the priority queue, such that a first cell in the selected set of cells having a first distance metric is processed before a second cell in the selected set of cells having second distance metric that is a lower than the first distance metric.

19. The method of claim 8, wherein the maximum distance cell estimates a location of a pole of inaccessibility of the shape.

20. A non-transitory computer-readable storage medium storing computer program instructions that, when performed by a processor, cause the processor to perform operations for digitally displaying a map, the operations comprising:

receiving, at a computing device, electronic map data describing a shape having a boundary, the shape being a geometric representation of a real-world object represented by the electronic map data;

generating a first plurality of cells, each cell of the first plurality of cells corresponding to a respective portion of the shape such that the shape is divided among the first plurality of cells;

calculating, for each cell of the first plurality of cells, a distance metric for the cell based on a distance from a center of the cell to a nearest point upon the boundary of the shape;

selecting at least one cell of the first plurality of cells as a selected set of cells to process;

recursively processing, based on the calculated distance metrics, the selected set of cells to determine a maximum distance cell that corresponds to a portion of a cell of the first plurality of cells, the maximum distance cell having a highest distance metric, and the center of the maximum distance cell being located within the boundary of the shape; and providing an electronic map based on the electronic map data describing the shape, the electronic map comprising an image of the shape and additional data that is displayed at a location of the maximum distance cell within the shape.

* * * * *

UNITED STATES PATENT AND TRADEMARK OFFICE
CERTIFICATE OF CORRECTION

PATENT NO.         : 10,380,454 B2
APPLICATION NO.    : 15/644183
DATED              : August 13, 2019
INVENTOR(S)        : Volodymyr Ahafonkin Page 1 of 1

It is certified that error appears in the above-identified patent and that said Letters Patent is hereby corrected as shown below:

On the Title Page

Abstract (57), Line 3: replace "The method involves receives" with -- The method involves receiving --

In the Claims

Column 21, Claim 7, Line 20: replace "distance metric that is a lower" with -- distance metric that is lower --
Column 22, Claim 18, Line 63: replace "distance metric that is a lower" with -- distance metric that is lower --

Signed and Sealed this
Tenth Day of November, 2020

Andrei Iancu
*Director of the United States Patent and Trademark Office*